July 10, 1951 D. V. STELLIN 2,559,833
LOCK WASHER
Filed Dec. 31, 1948 2 Sheets-Sheet 1
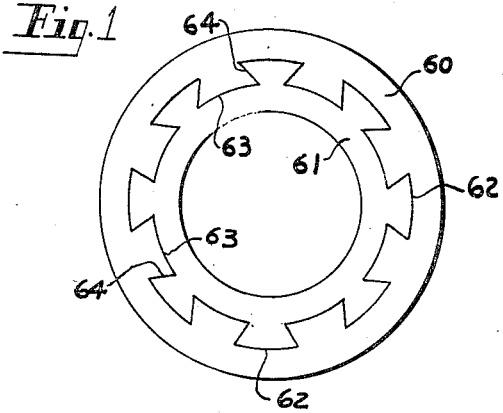
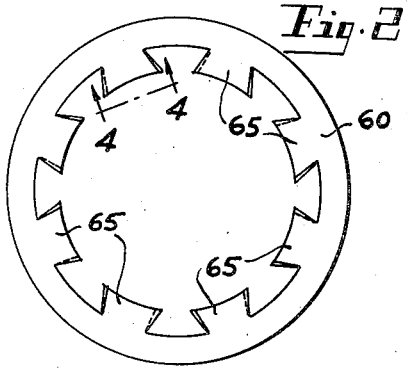
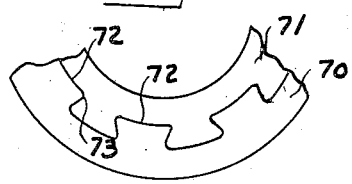
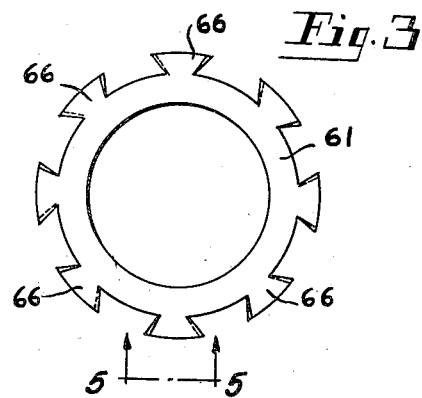
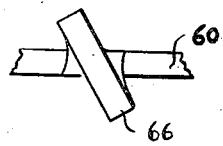
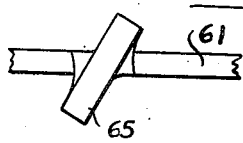
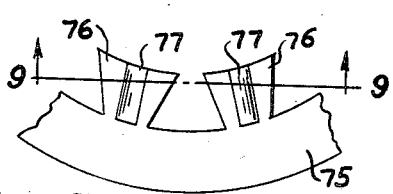
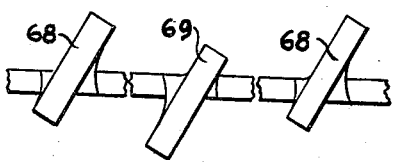
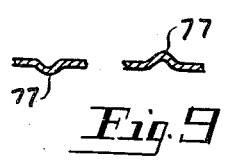
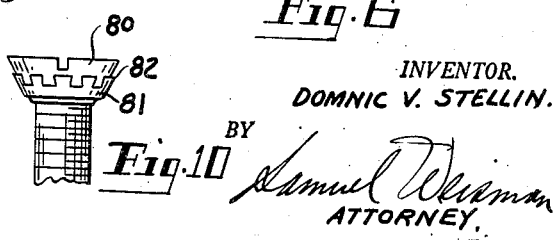
INVENTOR.
DOMNIC V. STELLIN.
BY
*Samuel Weisman*
ATTORNEY.

July 10, 1951        D. V. STELLIN        2,559,833
LOCK WASHER

Filed Dec. 31, 1948        2 Sheets-Sheet 2

INVENTOR.
DOMNIC V. STELLIN.
BY
ATTORNEY.

Patented July 10, 1951

2,559,833

UNITED STATES PATENT OFFICE 2,559,833

LOCK WASHER

Domnic V. Stellin, Chicago, Ill.

Application December 31, 1948, Serial No. 68,497

2 Claims. (Cl. 151—35)

The present invention pertains to lock washers and particularly to lock washers which are looseproof or, in other words, which do not loosen up by vibration. For convenience in description, the nut, bolt, screw, stud, or other member to be locked by the washer will be termed the rotary member.

One of the objects of the invention is to provide a lock washer of the prong type whose locking elements or teeth do not engage the rotary member with their entire locking edges as soon as the washer is engaged by the rotary member. Instead, my lock washer has its teeth or prongs so formed that only a point of each tooth is initially engaged by the rotary member, followed by a gradual and increasing engagement of the locking edges until the final adjustment is reached.

Another object of my invention is to provide a lock washer which does not require a large number of teeth or prongs to make it effective and one that is less susceptible to breakage under stress. The nature of the teeth or prongs, as will hereinafter appear, is such that a relatively small number of them may be used for a given locking effect. As a result of the reduced number of prongs, there is less severing of the metal blank, and in turn the washer is less liable to break under stress, especially in the case of a spring steel washer that has been heat treated.

Another object of this invention is to provide a lock washer which can be produced accurately for given loads in accordance with the principles of strength of materials. By these principles one can properly calculate the height and length of the teeth or prongs and therefore, their proper resiliency and flexibility can be maintained at all times when the lock washer is under pressure, even under the most extreme and difficult conditions.

Another object of my invention is to produce a steel lock washer that does not require a very high carbon content nor very close control of the manganese content. Ordinary spring steel has a carbon content .70–.80 while the manganese content is kept close to .60–.90. In my lock washers herein described, a less expensive steel can be used, having a carbon content of about .60–.70 and a manganese content of about .50–.80. Such a steel has a Rockwell hardness of about 42–46 C. when heat treated. The formula of course is subject to variations as desired.

Another object of the invention is to provide a lock washer that requires no removal of metal from the original blank, thereby avoiding an extra operation on the die and also avoiding the weakening of the teeth or prongs that would occur if metal were removed. In the accomplishment of this object, the metal blank is slit in a characteristic manner to form prongs which are then bent or twisted in a unique manner that will be described hereinafter.

In general the prongs or teeth are set and twisted in such a manner that they are directed circumferentially and do not present their entire edges or substantial lengths thereof, to the rotary member on initial contact therewith.

At the same time the prongs become so positioned that the ends of the two consecutive prongs do not bind or jam into each other, notwithstanding that no metal has been removed from the blank.

Another object of the invention is to provide a lock washer that does not require hard hitting dies in the formation of twisted prongs. The metal is slit and the prongs are formed by the same punches in a progressive die without socalled hard hitting. With calculation of the punches and dies as heretofore stated and avoidance of hard hitting, the lock washers of this invention lend themselves to greater efficiency in the manufacture and maintenance of the dies. The resiliency of the prongs can be controlled for the use to which the washer is to be applied. In some cases for example, in electrical work, a washer is required to maintain contact at all times, even in the case of excessive vibration. For this purpose ample room is provided in my lock washers to obtain the required resiliency in the prongs while maintaining constant contact.

Still another object of the invention is to provide for the production of two lock washers from a single blank and by no more punches, dies and operations than would be required for forming one washer. The two washers thus obtained are respectively of the external and internal type and are exactly alike in their effective dimensions, having the same gripping capacity, prong reach, strength and resiliency. Heretofore, external and internal washers made from a single blank were not alike and required additional punches and dies in their production as well as a larger bolster plate in the press.

Still another object of the invention is to reduce the liability of breakage by special formation in the washer. For example, in an annular washer the slits extend no more than half way through the washer radially and lie entirely on one side or the other of a medial circumference. Also, the opposing ridges extend only about half way across the washer, and this contributes further to the strength of the washer under stress. The ridges are always on same half of the washer i. e. if the prongs are on the inner half, the ridges also must be on the inner half and vice-versa.

The invention is fully disclosed by way of example in the following description and in the accompanying drawings in which:

Figure 1 is a plan view of a blank slit to form an external and internal washer of equal capacity;

Figure 2 is a plan view of the completed internal washer;

Figure 3 is a plan view of the completed external washer;

Figure 11:
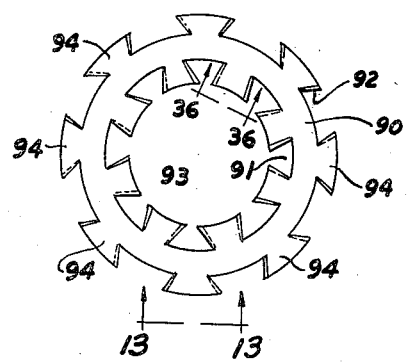
Figure 12:
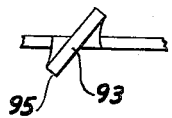
Figure 13:
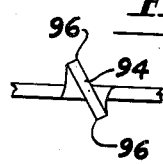
Figure 14:
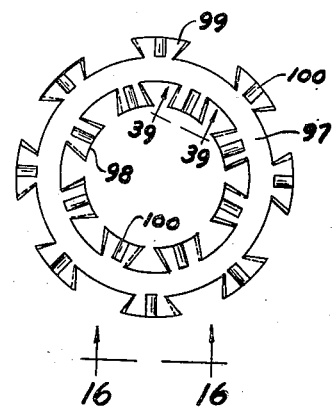
Figure 15:
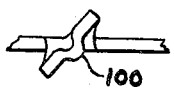
Figure 16:

Figures 4 and 5 are elevations on the lines 4—4 and 5—5 respectively of Figures 2 and 3;

Figure 6 is an edge view showing a modification of Figure 2 or 3;

Figure 7 is a fragmentary elevation, similar to Figure 1, illustrating a different tooth form;

Figure 8 is a detail plan view of still another modified form of washer;

Figure 9 is a section on the line 9—9 of Figure 8;

Figure 10 is an elevation showing a washer according to the invention, applied to a countersunk head screw;

Figure 11 is an elevation of a combined internal and external washer; Figures 12 and 13 are sections on the lines 12—12 and 13—13 of Figure 10; Figure 14 is a plan view of an internal and external washer with ridges, and Figures 15 and 16 are sections on the lines 15—15 and 16—16 of Figure 14.

Reference to these views will now be made by use of like characters, which are employed to designate corresponding parts throughout.

Figures 1 to 5 illustrate two washers of equal capacity formed from a single blank. An annular blank 69 is severed to form two rings or blanks 60 and 61. The line of separation between the rings consists of a series of equally spaced equal arcs 62 lying in one circumference, another series of arcs 63 alternating with the arcs 62 on a smaller circumference and equal in length to the arcs 62 and equally spaced, and short straight lines 64 joining the ends of the arcs 62 to the respectively adjacent ends of the arcs 63.

The staggered line of separation thus formed may be cut with a suitable punch and provides the separated washers as shown in Figures 2 and 3. The washer which includes the outer ring 60 has its prongs 65 extending inwardly and is, therefore identified as an internal type of washer. Similarly, the other washer having outwardly extending prongs 66 is known as an external type. Both washers are of the same capacity due to the equality of the arcs 62 and 63 as already set forth, and the substantial equality of the roots of the prongs which differ only slightly because of the unequal circumferences in which they lie. Thus, two standard washers or washers of substantially equal capacity formed from a single blank, thereby reducing by half the cost of punches, maintenance and operation.

The prongs are then twisted on a radial axis and in the same direction on a given washer. The angle of the twist is approximately 30 degrees as shown in Figures 4 and 5, although the angle may be varied to suit the occasion, and is so formed that each prong extends equally from each surface of the blank. Thus, both points or teeth of each prong are operative in cutting into the rotary member and fixed member.

Because of the equality of the arcs 62 and 63 on unequal circumferences, the connecting lines 64 converge outwardly from the ends of each arc 63 and inwardly from the ends of each arc 62, thus imparting a dove-tailed formation to the prongs, with roots shorter than the spaces as may be seen in Figures 4 and 5.

Figure 6 illustrates a modification of Figures 4 and 5. Alternating prongs 68 are twisted to extend a greater distance from a given surface of the blank than from the other surface. The intervening prongs 69 are reversed in this respect, extending the shorter distance from the first given surface and the longer distance from the other surface. Thus, alternate prongs engage only the rotary member and the intervening prongs engage the fixed member, both sets of prongs engaging at the points that are more remote from the plane of the blank. The increased distance from the plane of the washer to the cutting or operative point of a prong provides a greater and stronger effective prong length that will withstand a correspondingly greater compression.

The embodiment shown on Figure 7 is somewhat similar to that shown in Figure 1. The annular blank is divided into two rings 70 and 71 by a staggered line 72, having the characteristics of that shown in Figure 1. The difference is that the corners are rounded at 73 so that the corresponding prongs are similarly rounded at their cutting points. In some applications a rounded cutting point is preferred.

Figures 8 and 9 show on internal type of washer formed in the manner previously described and before twisting of the prongs. The blank or ring 75 has dovetailed prongs 76 extending from its inner circumference. The innovation in this case is the formation of the supporting ridges 77 in the prongs themselves rather than in the body of the washer. Successive ridges alternate on opposite sides of the blank as previously set forth and as shown in Figure 9.

Figure 10 illustrates a washer adapted to a countersunk screw head 80. The washer 81 is conical to receive the screw head and has its prongs 82 also arranged around the screw head. It will be understood that the prongs may be formed and bent or twisted according to any of the methods heretofore disclosed and may also be provided with supporting ridges in any of the described embodiments. The essential characteristic is that the washer has a generally conical rather than a flat form to fit on the screw head.

In Figure 11 is shown a combined internal and external washer. This washer formed from a suitable blank is an annulus 90 with dovetail notches 91 and 92 formed respectively at the inner and outer circumferences. These notches form intervening dovetail teeth or prongs 93 and 94 respectively at the inner and outer circumferences and tapering toward the root or the undisturbed part of the annulus.

All are twisted in the same direction, bringing the free biting points 95 of prongs 93 and the points 96 of prongs 94 equally spaced at the opposite sides of the plane of the annulus. The preferred arrangement is such that, proceeding clockwise, the first point of each prong is below said plane and the remaining point is above the plane. The number of prongs may vary on either circumference, according to the size of the washer or the location where it is to be used.

A similar washer is shown in Figures 14 to 16, formed from an annulus with internal teeth 98 and external prongs 99 disposed and twisted as in Figure 11. Each prong is reinforced by a radial ridge 100 along the center substantially as in Figure 8.

The washers described herein require no removal of metal from the blank. Consequently, the washer is relatively stronger, and the punches and dies are subjected to less wear. The cost of manufacture and maintenance of the punches and dies is correspondingly reduced.

The bent or twisted prongs are rigid at the root and resilient at the cutting points. This condition is desirable since no bending at the roots under pressure is contemplated. On the other hand the free or cutting ends of the prongs, although cutting into the adjacent members, are desirably resilient, since the resiliency develops a tension that resists vibration of these members.

The gradual digging of the prongs into the adjacent member, as described, forms a groove with a sloping bottom, the groove having its greatest depth and width at the end where the final adjustment of the rotary member is made. As the rotary member tends to unscrew or become loose, it works against the surfaces of a groove of decreasing dimensions, which present a pressure that resists unscrewing. Vibration of the parts, if effective at all, will tighten the rotary member still further, since movement in the loosening direction is resisted as described in conjunction with the compression of the resilient tooth end, which constantly holds the tooth end in engagement with the walls of the groove.

These washers lend themselves to economical production by means of progressive dies. Such dies can be constructed to operate at 100 strokes per minute without damage, of much higher depending on size of wisher punched, especially if the stock passes through oiled pads before entering the dies for punching.

The described lock washers can be produced in larger quantities and more cheaply than the ordinary types of washers, because of the cheaper grade of steel that can be used as previously set forth. Also a lighter gauge of steel may be used for a given capacity since there is no removal of metal to weaken the blank.

According to present practice, lock washers are made in different types and capacities for a given diameter. For example, for a given diameter there may be light duty, medium duty and heavy duty washers and possibly some intervening grades. A given type of washer of the character disclosed herein and of a given size and capacity is suitable for various loads and for all types of standard bolts and nuts, all SAE bolts and nuts, and for all round head machine screws. Although various modifications have been shown and although these may be further modified one in view of the other any accepted and standardized design may be used for the aforementioned variety of installations.

The various disclosed designs of prongs, ridges and other features may be interchanged with one another in any desired combination. Internal or external washers, or a combination internal and external washer, or countersunk washers, may be made by the selection of any desired type of prong, ridge, slit, twist or other feature.

The number of prongs or ridges in any given washer may be more or less than disclosed herein, according to requirements, and the ridges may be omitted entirely in some cases if desired. Staggering of the prongs, as in Figure 30, may be introduced in other designs than those shown. The angle of the twist, which is disclosed as being between 30 and 45 degrees, may be greater or smaller in any selected design of washer. The dimensions of some of the prongs, slits and edges, such as their height, length and width, are in some instances exaggerated in the drawings.

Although specific embodiments of the invention have been illustrated and described, it will be understood that various alterations in the details of construction may be made without departing from the scope of the invention as indicated by the appended claims.

What I claim is:

1. A lock washer comprising a flat annular portion, spaced dovetail-shaped teeth extending radially from a circumference thereof, said teeth narrowing from the free end toward said portion and being twisted about a substantially radial axis where they join said circumference, leaving the annular portion flat, the free corners of each tooth being disposed respectively at opposite sides of the annular portion, the side marginal edges of said teeth extending laterally from said annular portion to said free corners.

2. A lock washer as set forth in claim 1, wherein said teeth are formed with substantially radially extending corrugations, one corrugation for each tooth, said corrugations being disposed solely in the teeth.

DOMNIC V. STELLIN.

REFERENCES CITED

The following references are of record in the file of this patent:

UNITED STATES PATENTS

| Number | Name | Date |
|---|---|---|
| Re. 19,222 | Connell | June 26, 1934 |
| 331,169 | Thomas | Nov. 24, 1885 |
| 1,659,161 | Richer | Feb. 14, 1928 |
| 1,660,772 | Swenson | Feb. 28, 1928 |
| 1,715,777 | Olson | June 4, 1929 |
| 1,845,272 | Hosking | Feb. 16, 1932 |
| 1,874,596 | Stenger | Aug. 30, 1932 |
| 1,878,199 | Olson | Sept. 20, 1932 |
| 1,926,917 | Rosenberg | Sept. 12, 1933 |
| 2,158,378 | Olson | May 16, 1939 |
| 2,322,776 | Poupitch | June 29, 1943 |